United States Patent Office 3,201,052
Patented Aug. 17, 1965

3,201,052
PROCESS FOR CRUSHING AND COOLING CALCIUM CARBIDE BLOCKS
Klaus Feldmann and Alfred Rumberg, Hermulheim, near Cologne, Helmuth Klee, Knapsack, near Cologne, Heinrich Floor, Bruhl, near Cologne, and Anton Schummer, Hamburg, Germany, assignors to Knapsack-Griesheim Aktiengesellschaft, Knapsack, near Cologne, Germany, a corporation of Germany
No Drawing. Filed Oct. 30, 1962, Ser. No. 234,205
3 Claims. (Cl. 241—23)

The present invention relates to a process for cooling calcium carbide.

The processes customarily used for cooling liquid calcium carbide, tapped at a temperature of about 2000° C., to a temperature of about 100 to 150° C. suitable for the further processing of the calcium carbide, for example by crushing, grinding, sieving or packing, all involve the disadvantage that more or less great amounts of the calcium carbide undergo reaction with atmospheric steam, oxygen or nitrogen and are thus lost.

Losses of calcium carbide, which undergoes reaction with steam according to the equation $$CaC_2 + 2H_2O \rightarrow Ca(OH)_2 + H_2C_2$$

occur especially at the surface of the carbide block if the calcium carbide tapped into tap ladles or crucibles is allowed to stand in a cold store until the temperature in the interior of the carbide block enables the carbide to be further processed without the processing apparatus being impaired. The necessary cooling time depends primarily on the size of the carbide block concerned and may amount, for example, to about 35 to 40 hours with a carbide block weight of 2 metric tons. During that time, the carbide block is exposed to atmospheric steam and then decomposes at its surface in the manner described above, especially at a surface temperature below 200° C.

In order to shorten the cooling time and thereby to reduce the losses of calcium carbide or acetylene due to the reaction with atmospheric steam, the hot or even partially liquid calcium carbide can be removed from the crucible and introduced into cooling drums externally rinsed with water, or the liquid carbide may be allowed to travel from the furnace directly to the cooling drum. Such operation is, however, associated with other reactions which even involve substantially greater losses of carbide or acetylene; for example, the hot calcium carbide undergoes combustion with atmospheric oxygen or absorbs nitrogen with the resultant formation of calcium cyanamide or similar compounds, apart from the great quantity of dust obtained in the cooling drum and other technical disadvantages.

The present invention unexpectedly provides a process for cooling calcium carbide which avoids all the above disadvantages, wherein molten carbide is allowed to cool in a first cooling step, for example in a pan or crucible, to a surface temperature of about 200° C., removed from the pan or crucible, the carbide removed is crushed, preferably in a cooled rotary crusher, to a grain size smaller than 100 mm., the crushed carbide is cooled in a second cooling step in layers at most 50 cm. thick, preferably 20 to 30 cm. thick, for a period of up to 45 minutes, preferably 30 minutes, and then processed.

According to a special embodiment of the present invention, the crushed or comminuted carbide is given in layer form on to a conveying means, for example a box or plate conveyor belt or bucket conveyer, which can be operated at variable speed and transport the crushed or comminuted carbide, which is being cooled while transported, to the processing means.

In accordance with the present invention, the carbide block is crushed and simultaneously therewith mixed at a moment where its surface temperature has so dropped that decomposition of the carbide, which is produced by atmospheric steam, is just avoided. This has the effect that the temperature in the interior of the carbide block of at least 600° C. and the relatively low surface temperature of the carbide block balance each other within a very short period of time with a resultant temperature of about 400° C. in the carbide layers. At that temperature, the reaction with steam substantially is still immaterial and the attack of oxygen and nitrogen, which require a temperature above 600° C. to attack the calcium carbide, is avoided.

In other words, the carbide surface temperature is thereby increased and so is the heat radiated by the carbide, so that the entire time required for cooling is substantially reduced with the result that a substantially smaller cooling area and substantially less crucibles are pans are needed with the resultant saving of considerable costs, the size of the plant being the same.

The following examples serve to illustrate the invention, but they are not intended to limit it thereto:

*Example 1*

Liquid carbide containing 293 l./kg. acetylene was cooled in known manner in a crucible having a capacity of 1.8 metric tons until the temperature in the interior of the carbide block had dropped to 150° C. This was the case after about 40 hours. The carbide block was first crushed to a grain size smaller that 100 mm. and then further comminuted, including the reaction products which had formed at the carbide surface, to a grain size of at most 2 mm. 10 samples were taken in accordance with the rules of sampling which had an average acetylene content of 287 l./kg. The loss of carbide or acetylene was about 2%.

*Example 2*

Liquid carbide containing 295 l./kg. acetylene was tapped in known manner and introduced into an externally water-rinsed cooling drum 40 meters long. The carbide removed from the drum in a grain size of up to 100 mm. had a temperature of 150° C. The carbide was further comminuted to a grain size of up to 2 mm. 10 samples taken in accordance with the rules of sampling had an average acetylene content of 274 l./kg. The loss was accordingly about 3%.

*Example 3*

Liquid carbide containing 295 l./k. acetylene was cooled according to this invention in a crucible having a capacity of 1.8 metric tons until the carbide surface temperature had dropped to about 200° C. The carbide was then removed from the crucible, the carbide block was crushed to a grain size smaller than 100 mm., the crushed carbide was given in layers about 30 cm. thick on the box belts driven at such a speed that the carbide removed from the last belt after about 30 minutes had a temperature of about 150° C. The carbide was further comminuted to a grain size of up to 2 mm. and 10 samples were taken in accordance with the rules of sampling. The samples had an average acetylene content of 293.5 l./kg. The loss was accordingly about 0.5%.

We claim:

1. In the process for cooling calcium carbide solidified in blocks from the liquid calcium carbide, the improvement which comprises cooling the blocks in a first cooling step to a surface temperature of about 200° C., crushing the blocks, and cooling the crushed material in a second cooling step in layers at most 50 cm. thick before finally processing this material.

2. The process of claim 1, wherein, after the first cooling step, the calcium carbide is crushed to a grain size smaller than about 100 mm.

3. The process of claim 1, wherein the calcium carbide is cooled in the second cooling step in layers about 20 to 30 cm. thick.

References Cited by the Examiner
UNITED STATES PATENTS

| | | | |
|---|---|---|---|
| 946,510 | 1/10 | Hartstein. | |
| 1,036,525 | 8/12 | Morehead et al. | 23—208 X |
| 1,889,951 | 12/32 | Cox | 23—208 X |
| 2,860,037 | 11/58 | Kamlet | 23—208 |
| 2,953,445 | 9/60 | Rummel | 23—208 X |

J. SPENCER OVERHOLSER, *Primary Examiner.*

UNITED STATES PATENT OFFICE
CERTIFICATE OF CORRECTION

Patent No. 3,201,052　　　　　　　　　　　　　　　　August 17, 1965

Klaus Feldmann et al.

It is hereby certified that error appears in the above numbered patent requiring correction and that the said Letters Patent should read as corrected below.

Column 2, line 19, for "resultiant" read -- resultant --; line 40, for "295" read -- 283 --.

Signed and sealed this 25th day of October 1966.

(SEAL)
Attest:

RNEST W. SWIDER
ttesting Officer

EDWARD J. BRENNER
Commissioner of Patents